March 19, 1929.   C. E. GOODYEAR   1,706,288
APPARATUS FOR USE IN THE MANUFACTURE OF WHEELS
SUCH AS THE ROAD WHEELS OF VEHICLES
Filed July 10, 1925   2 Sheets-Sheet 1

March 19, 1929.   C. E. GOODYEAR   1,706,288
APPARATUS FOR USE IN THE MANUFACTURE OF WHEELS
SUCH AS THE ROAD WHEELS OF VEHICLES
Filed July 10, 1925   2 Sheets-Sheet 2

Patented Mar. 19, 1929.

1,706,288

UNITED STATES PATENT OFFICE.

CLAUDE EUGENE GOODYEAR, OF KIDDERMINSTER, ENGLAND, ASSIGNOR TO THE DUNLOP RUBBER COMPANY LIMITED, OF ERDINGTON, BIRMINGHAM, ENGLAND.

APPARATUS FOR USE IN THE MANUFACTURE OF WHEELS, SUCH AS THE ROAD WHEELS OF VEHICLES.

Application filed July 10, 1925, Serial No. 42,791, and in Great Britain June 2, 1925.

This invention relates to the manufacture of wheels such as the road wheels of vehicles, and it refers particularly to wheels composed of sheet metal and incorporating two sheaves or half-members divided at or at about the mid-plane of the wheel and joined permanently, as for instance by a welding process.

In my prior application Serial No. 42,788, I have described a wheel of this type in which the rim element of the wheel is essentially or primarily incorporated as an integral part of the sheaves or half-members of the wheel, the side elements of the rim portion of the wheel being of loop or hollow formation. The present invention provides an apparatus for efficiently forming the said loop or hollow side formations.

In the construction according to my prior application above mentioned the rim portion of the wheel incorporates a circumferential member having flanges which internally reinforce the loop like side formations as against outward derangement, and the apparatus according to the present invention is adapted to spin or otherwise swage the edges of the sheave elements inwardly around the flanges of this circumferential member.

This process is advantageously effected in two steps by the utilization of a composite machine. In the first step a roller is advanced in a direction lying in the plane of the wheel to inturn the edges of the sheaves, which latter, when assembled, have assumed inwardly projecting positions at right angles to the plane of the wheel. The application of this first roller serves to inturn the edges of the sheaves until they each assume an oblique position in the radial section of the wheel, and in a subsequent process by a second roller or rollers the oblique edges are successively or simultaneously brought into intimate contact with the flange of the circumferential member so that they butt against the base of the latter. This second roller, in addition to being capable of a movement in the plane of the wheel, is capable of a lateral movement and by this lateral movement and/or by the combined inward and lateral movements it is possible effectually to inwardly roll or spin the edge of the sheaves so that it is brought into intimate contact with the flange of the circumferential member.

In order that this invention may be clearly understood and readily carried into practice reference may be had to the appended sheet of explanatory drawings, on which Figure 1 illustrates in plan, partly in section, an embodiment of the invention before the wheel has been subjected to any treatment.

In a convenient embodiment of the present invention I provide apparatus for clamping the wheel and rotating it. This clamping provision may comprehend two plates $a$ $a$, one of which is provided with a locating plug $b$ adapted to project into the central aperture in the wheel and these two plates are adapted to be bolted together as at $c$ to grip the wheel at the rim. The loop-like side formations of the rim are externally supported by groovings of shape corresponding with the outward contours of the rim sides.

Figure 1:
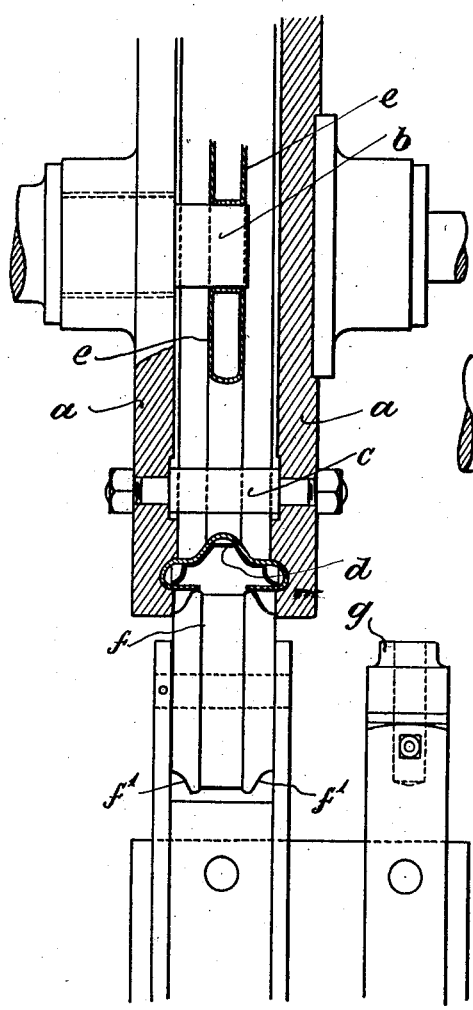
Figure 2:
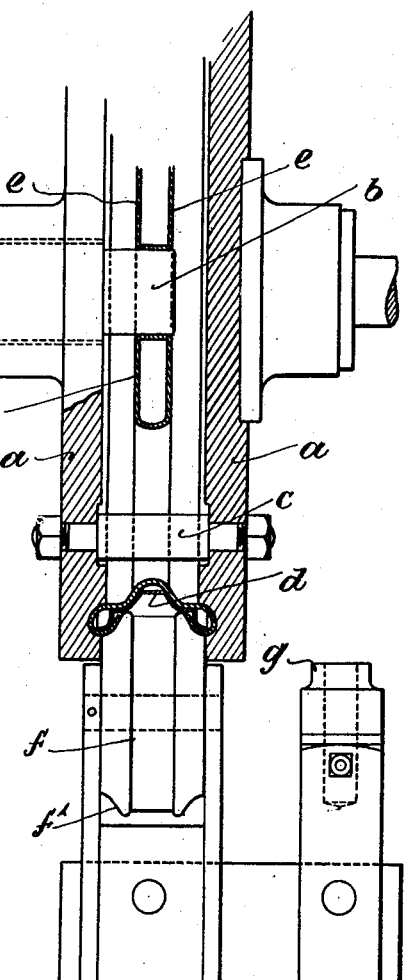
Figure 2 is a view similar to Figure 1, but showing the position with the parts at the completion of the first process.
Figure 3:
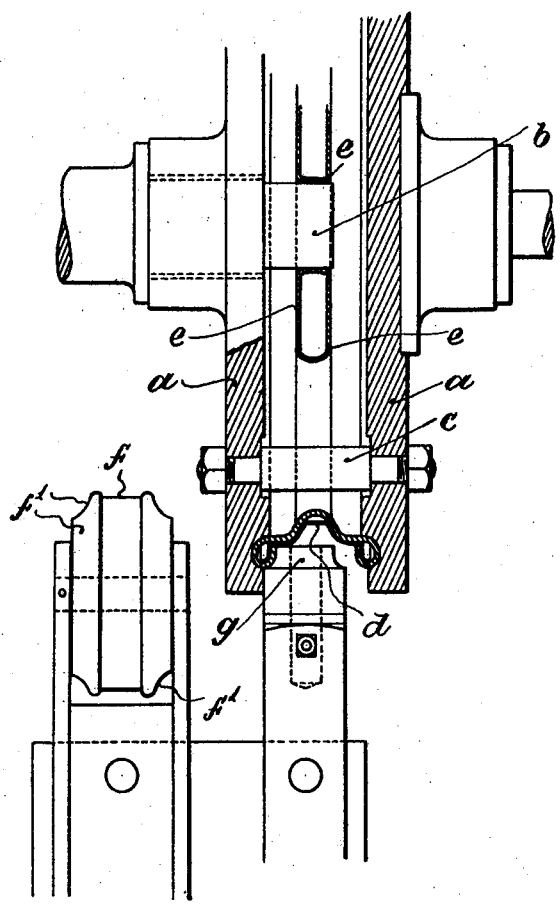
Figure 3 illustrates the second process with the wheel in its finished form.

The wheel thus clamped is one which incorporates the circumferential member $d$ with the sheaves or half-members $e$ $e$ already welded together and having their edges projecting inwardly towards each other at right angles to the main plane of the wheel as shown in Figure 1.

In relation to this wheel carrier a compound slide is incorporated. This slide carries one roller $f$ adapted to be advanced rectilinearly in the plane of the wheel to inturn the edges of the sheaves into a substantially oblique position. This roller has at each side an oblique surface $f^1$ terminating with a curved formation corresponding with the radially outermost face of the loop. When the sides of the sheaves have thus been rolled inwardly the compound rest is manipulated to bring a second roll $g$ into position within the partly formed rim. This second roll is at its periphery of curvature corresponding with the curvature which the loop formation is adapted ultimately to assume, and by laterally advancing this second roll with or without attendant advance in the direction of the plane of the wheel the oblique edges of the sheaves $e$ $e$ are brought effectually into contact with the flanges of the circumferential member $d$. The operation may then be repeated on the other side of the wheel.

Having described my invention, what I claim and desire to secure by Letters Patent is:—

1. Apparatus of the class described, comprising means for mounting a wheel for rotation of the wheel and also means for clamping a trough shaped wheel rim; a roller having a supporting axle on which said roller may rotate, the axis of rotation of said roller being parallel with that of the wheel and said roller being arranged in the plane of the wheel and means to move said roller toward the axis of rotation of said wheel and thereby cause said roller to force the side edges of the trough or furrow of the rim inwardly therein.

2. Apparatus as claimed in claim 1 including also a second roller, the axis of rotation of which is radial to the wheel and means for moving said second roller transversely with respect to the wheel to cause the same to shape the side edges of the furrow or trough of the rim.

In witness whereof I affix my signature.

C. E. GOODYEAR.